United States Patent
Cayley, Jr.

[11] Patent Number: 5,286,148
[45] Date of Patent: Feb. 15, 1994

[54] TABLE EXTENDER FOR A MILLING MACHINE

[75] Inventor: Michael P. Cayley, Jr., Schaumburg, Ill.

[73] Assignee: Midaco Corporation, Elk Grove Village, Ill.

[21] Appl. No.: 30,904

[22] Filed: Mar. 15, 1993

[51] Int. Cl.⁵ .................... B23Q 3/02; B23Q 1/00
[52] U.S. Cl. ........................... 409/219; 269/309
[58] Field of Search ............ 409/219; 269/900, 289, 269/292, 309; 108/143, 137, 20; 198/346.1, 345.3

[56] References Cited

U.S. PATENT DOCUMENTS

| | | | |
|---|---|---|---|
| 3,461,776 | 8/1969 | Hamori et al. | 409/219 |
| 3,543,638 | 12/1970 | Braun | 409/219 |
| 3,942,780 | 3/1976 | Clement | 269/900 X |
| 4,444,541 | 4/1984 | Bergman | 269/309 X |
| 4,534,546 | 8/1985 | Catiani | 265/309 X |
| 4,688,974 | 8/1987 | Wright et al. | 409/219 |
| 4,738,439 | 4/1988 | Satake | 269/309 |
| 4,759,536 | 7/1988 | Takeuchi et al. | 269/309 X |

FOREIGN PATENT DOCUMENTS

| | | | |
|---|---|---|---|
| 292467 | 11/1988 | European Pat. Off. | 269/289 R |
| 3410359 | 10/1985 | Fed. Rep. of Germany | 269/309 |
| 256098 | 4/1988 | Fed. Rep. of Germany | 269/289 R |

Primary Examiner—William Briggs
Attorney, Agent, or Firm—Hill, Steadman & Simpson

[57] ABSTRACT

A table extender for a milling machine which includes upper and lower work support members with the lower work support mounted on the table or bed of a milling machine and a pair of shot pins moveably mounted in the lower work support and engageable in openings in the upper work support. The upper work support is moveable on slides relative to the lower work support and a locking handle is provided so as to lock and unlock the shot pins to allow the upper and lower work supports to be moved relative to each other.

5 Claims, 2 Drawing Sheets

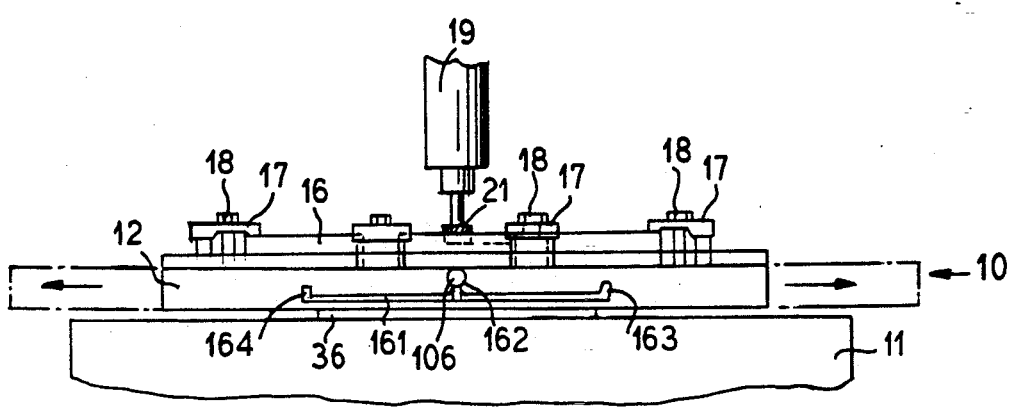
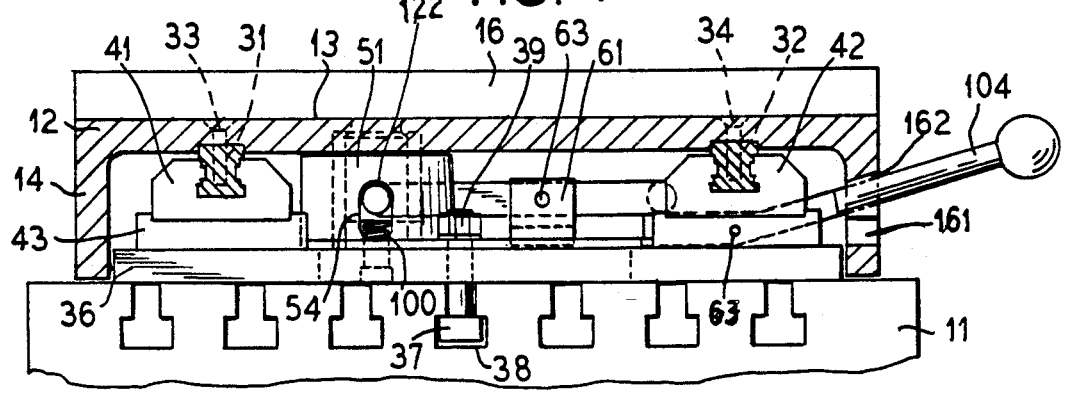
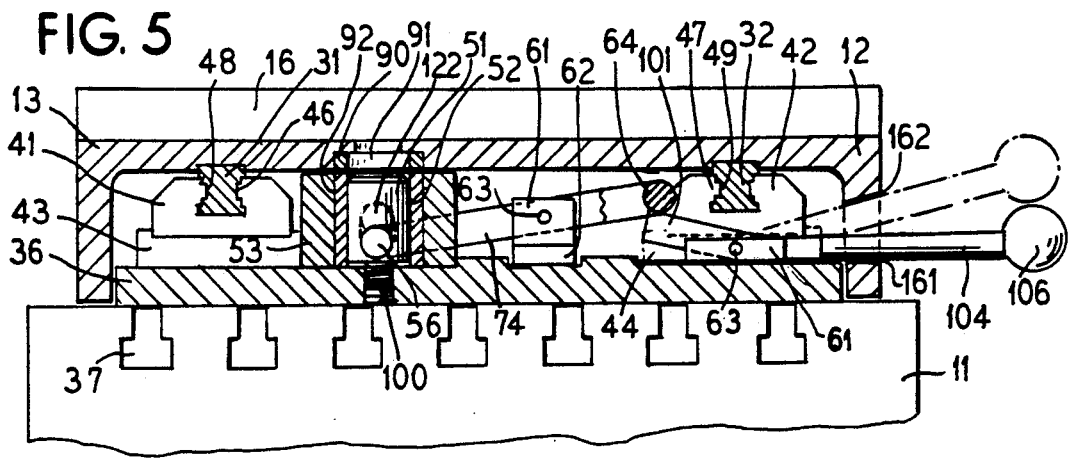

TABLE EXTENDER FOR A MILLING MACHINE

CROSS-REFERENCES TO RELATED APPLICATIONS

This application is related to U.S. application Ser. No. 747,955, filed Aug. 21, 1991 entitled "Fast Change Set-Up Device For Work On Work Support" by Michael P. Cayley, Jr. assigned to the assignee of the present application, now allowed.

BACKGROUND OF THE INVENTION

1. Field of the Invention

This invention relates in general to a table extender for a milling machine.

2. Description of Related Art

In milling machines, it is necessary to attach a workpiece to a table or bed which positions and holds the workpiece so that a machine tool can be used to form the workpiece. Often times it is necessary to do milling or cutting over a substantial distance on the workpiece and it has previously been necessary under such conditions to unclamp the workpiece from the workpiece support and move it and reposition it.

SUMMARY OF THE INVENTION

It is an object of the present invention to provide a table extender for a milling machine wherein a workpiece can be attached to an upper work support which is locked in position to a lower work support mounted on the table or bed of a milling machine.

The present invention allows the upper work support to be moved discrete distances to the left or right from a center position and relocked so as to allow larger workpieces to be machined without unclamping them from the upper work support.

It is a feature of the present invention to provide a moveable upper work support that is moveably connected to a lower work support and which can be locked in discrete positions to allow the table to be extended to either side.

It is a feature of the present invention to provide a lower work support which can be attached to the table or bed of a milling machine and to which an upper work supporting member is moveably connected and which can be locked in discrete selected positions.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3 is a side plan view of the invention;

FIG. 4 is a sectional view illustrating the upper work support lock to the lower work support; and FIG. 5 is a sectional view illustrating the upper work support unlocked relative to the lower work support.

DETAILED DESCRIPTION OF THE PREFERRED EMBODIMENTS

Figure 2:
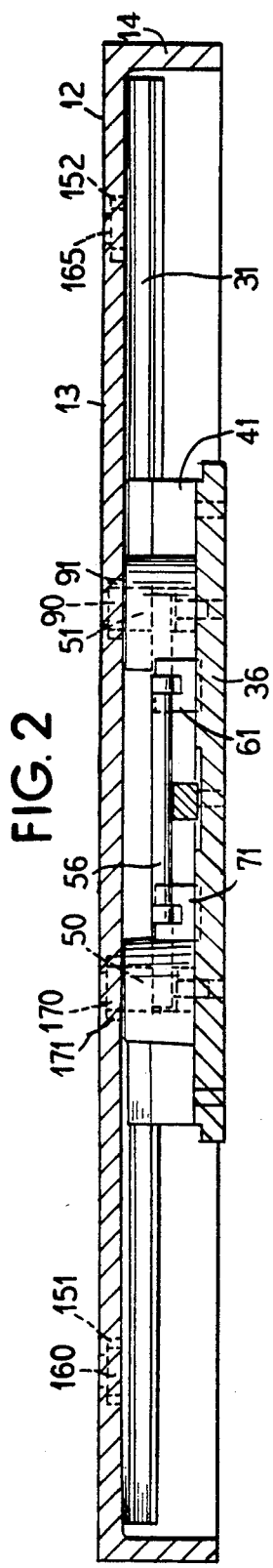
FIG. 2 is a sectional view taken on line II—II from FIG. 1.

As shown in FIG. 3, a table or bed 21 carries a lower work support 36 which is attached to the table or bed 11 by bolts 37 which are mounted in slots 38 and which are provided with nuts 39 as illustrated in FIG. 4. The upper work support member 12 is formed with downwardly extending side walls 14 and a top surface 13.

A pair of longitudinally extending guides 31 and 32 are attached to the under side of the upper work support 12 by set screws 33 and 34 as shown in FIG. 4. Mating slides 41 and 42 are formed so as to mate with the slides 31 and 34 and are provided with extensions that fit in recesses formed in the slides 31 and 32 as shown in FIGS. 4 and 5. The members 41 and 42 are attached to members 43 and 44 which are attached to lower work support member 36. The slides 31 and 32 and 41 and 42 allow the upper work support 12 to move relative to the lower work support 36.

Figure 1:
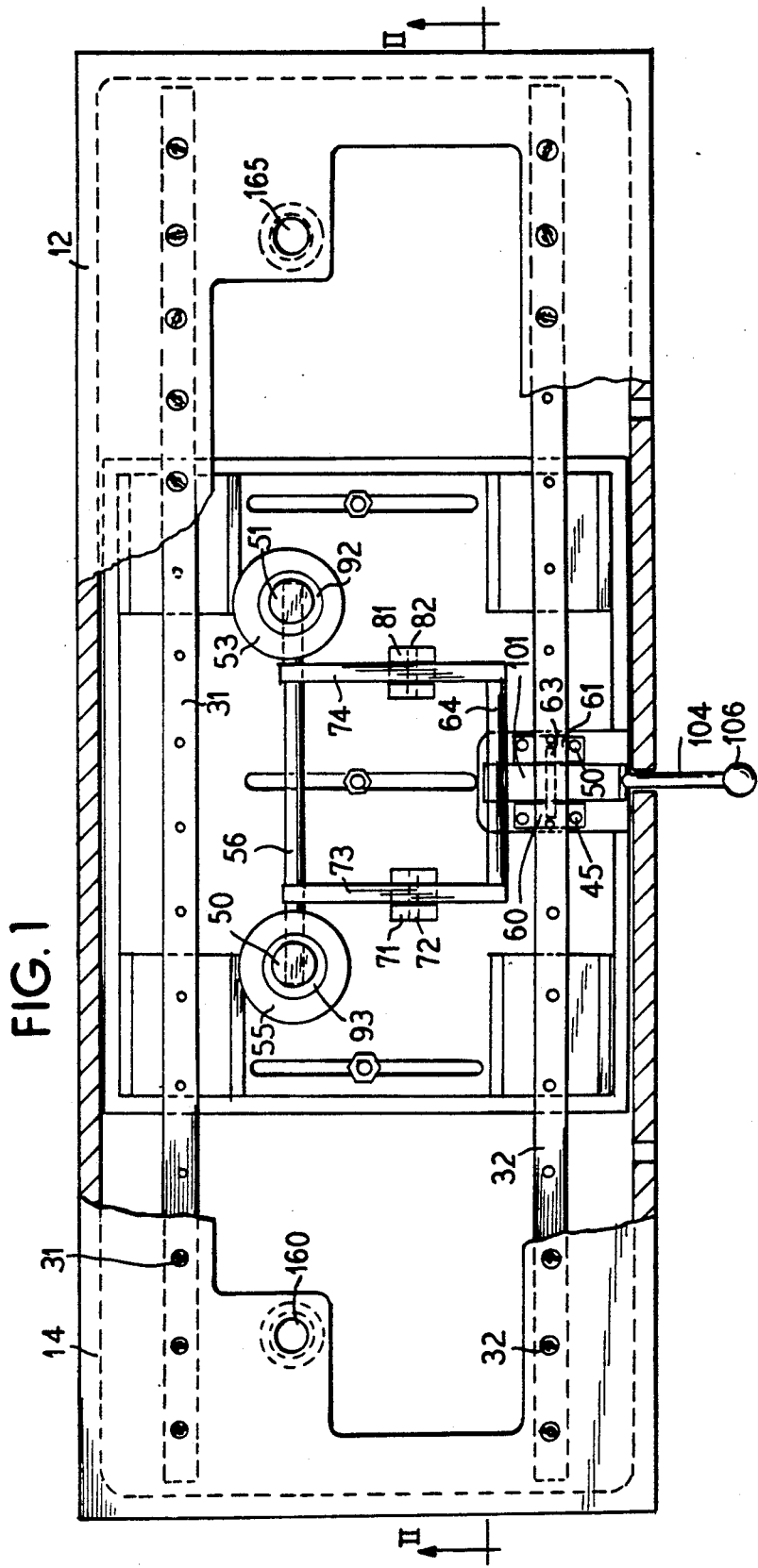
FIG. 1 is a partially cut-away plan view of the invention.

Means are provided for locking the upper work support 14 to the lower work support 36 in selected positions. Such means comprises a lever 101 which is pivotally connected by pivot pin 63 to brackets 60 and 61 and the brackets 60 and 61 are connected to the lower work support 36 by suitable bolts 45 and 50 as illustrated in FIG. 1. The lever 101 is provided with a handle 104 which terminates in a knob 106. A pin actuating member comprises a transverse shaft 56 to which are attached shafts 73 and 74 which are pivotally connected by pivot pins 72 and 82 to brackets 71 and 81 which are attached to the upper surface of the lower work support 36 as illustrated in FIG. 1. A shaft 64 is attached to the ends of the shafts 73 and 74 as shown in FIG. 1 and is engageable by the actuating lever 101 connected to handle 104 as shown in FIGS. 4 and 5. A pair of shot pin guide means 53 and 55 are mounted on the lower work support and are formed with central openings in which guide sleeves 92 and 93 are mounted. Shot pins 50 and 51 are mounted in the sleeves 92 and 93. The shot pins 50 and 51 are formed with slots 122 which extends through the sleeves 92 and the members 53 and 55 and the ends of the shaft 56 extend therein so as to move the shot pins 50 and 51. Springs 100 are mounted in the lower work support and engage the shot pins 50 and 51 to bias them in the upper direction relative to FIGS. 4 and 5. Mating openings are formed in the lower surface of the upper work support 12 such as the opening 90 in which the sleeve 91 is received as shown in FIG. 5. The upper ends of the shot pins 50 and 51 are tapered so as to facilitate mating engagement between the shot pins and the sleeves in the upper work support 12.

The handle 104 extends through a slot 161 which is formed with locking openings 162, 163 and 164 as shown in FIG. 3. As best shown in FIGS. 1 and 2, the lower surface of the upper work support 12 is formed with four openings 160, 170, 90 and 165 in which sleeves 151, 171, 91 and 152 are located.

As best shown in FIG. 3, the workpiece 16 is held by clamps 17 which are provided with bolts 18 to lock the workpiece to the upper work support 12. A milling machine 19 is formed with a tool 21 so as to mill the workpiece 16.

The workpiece 16 is attached to the upper work support 12 by the clamps 17 and bolts 18 with the upper work support 12 in the position shown in FIGS. 1 and 2 with the shot pins 50 and 51 received in the openings 170 and 90 and with the handle 104 in the position shown in FIGS. 1 and 4 so that the springs 100 can push the shot pins 50 and 51 into the openings 170 and 90 to lock the upper work support 12 to the lower work support 36. In this position, the milling machine 19 can be actuated so that the tool 21 forms the workpiece 16.

So as to move the upper work support 12 relative to the lower work support 36, the handle 104 is moved by the knob 106 to the position shown in FIG. 5 such that the handle 104 is aligned with the slot 161 in the upper work support 12. When the handle 104 is in this position, the lever 101 engages the shaft 64 to raise it as shown in FIG. 5, thus, causing the shaft 56 to move downwardly as shown in FIG. 5 in the slot 122 so as to draw the shot pins 50 and 51 out of the openings 170 and 90 so that the upper work support 12 is unlocked from the lower support 36. In this condition, the upper work support 12 can be moved on the slides 41 and 42 to the left or right relative to FIGS. 1, 2 and 3 with the handle 104 moving in the slot 161. When the handle 104 is at the end of the slot 161 as, for example, at the end to the left relative to FIG. 3, the handle may move up into a vertical slot 164, thus, locking the shot pins 50 and 51 so that they can move into the openings 160 and 170 with the upper work support 12 extended to the right as shown in dash dot position in FIG. 3. The workpiece may again be machined in this position.

Also, the upper work support 12 may be moved to the far left position by moving the shaft 104 down to the position shown in FIG. 5 to unlock the shot pins 50 and 51 so that the upper work support 12 can be moved to the far left position as shown in dash dot position at the left in FIG. 3. Then the handle 104 can be released so that it moves up into the transverse slot 163 thus allowing the shot pins 50 and 51 to be locked in the openings 90 and 165 to hold the upper work support 12 in the far left position relative to FIGS. 1, 2 and 3.

It is seen that the present invention provides means for extending the table for milling machines by moving an upper work support relative to a lower work support and locking it in predetermined positions.

Although the invention has been described with respect to preferred embodiments, it is not to be so limited as changes and modifications can be made which are within the full intended scope of the invention as defined by the appended claims.

I claim as our invention:

1. A table extender for a milling machine comprising, a milling machine with a lower work support having means for attachment to a bed of the milling machine, an upper work support slidably connected by linear guides to said lower work support, a first plurality of spaced vertically moveable shot pins mounted on said lower work support, a second plurality of spaced vertical openings greater in numbers than said first plurality formed in the lower surface of said upper work support, and locking means mounted on said lower work support and engageable with said plurality of shot pins to move them up into selected ones of said plurality of spaced vertical openings in said upper work support to lock said upper and lower work supports together at different selected positions.

2. A table extender for a milling machine according to claim 1 wherein said locking means comprises, a lever pivotally mounted on said lower work support and moveable to a first position to move said plurality of spaced shot pins out of said plurality of vertical openings in said upper work support and said lever; moveable to a second position to move said plurality of shot pins into said plurality of vertical openings.

3. A table extender according to claim 2 including, a plurality of springs engageable with said plurality of shot pins to bias them into the locked position.

4. A table extender according to claim 3 including a pivotally mounted linkage means engageable with said plurality of shot pins, and said lever engageable with said linkage means to move said plurality of shot pins.

5. A table extender according to claim 4 including a handle attached to said lever and extending through a horizontal slot formed in said upper work support, and a plurality of vertical slots formed in said upper work support which extend to said horizontal slot and said handle receivable in said vertical slots.

* * * * *